United States Patent
Fuse

(10) Patent No.: US 7,317,555 B2
(45) Date of Patent: Jan. 8, 2008

(54) IMAGE FORMING APPARATUS

(75) Inventor: Hiroyuki Fuse, Tagata-gun (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 995 days.

(21) Appl. No.: 10/423,962

(22) Filed: Apr. 28, 2003

(65) Prior Publication Data

US 2003/0202203 A1    Oct. 30, 2003

(30) Foreign Application Priority Data

Apr. 30, 2002   (JP) .............................. 2002-128877

(51) Int. Cl.
*H04N 1/60* (2006.01)
*H04N 1/407* (2006.01)

(52) U.S. Cl. .................. 358/1.9; 358/3.28; 399/366; 382/112; 382/135

(58) Field of Classification Search ............... 382/112, 382/135; 399/366; 358/1.9, 1.14, 3.28
See application file for complete search history.

(56) References Cited

U.S. PATENT DOCUMENTS 6,128,401 A * 10/2000 Suzuki et al. ............... 382/135
6,215,512 B1    4/2001 Imaizumi et al.
6,462,838 B1 * 10/2002 Hirata et al. ............... 358/3.05
6,839,146 B1 *  1/2005 Ishida et al. ............... 358/1.14
7,002,709 B1    2/2006 Terada et al.
7,095,514 B1 *  8/2006 Yamagata et al. .......... 358/1.14

FOREIGN PATENT DOCUMENTS

| JP | 11-352744 | 12/1999 |
| JP | 2000-175031 | 6/2000 |
| JP | 2000-196873 A | 7/2000 |
| JP | 2000-253233 A | 9/2000 |

* cited by examiner

*Primary Examiner*—Douglas Q. Tran
*Assistant Examiner*—Chan S. Park
(74) *Attorney, Agent, or Firm*—Foley & Lardner LLP

(57) ABSTRACT

When the present image forming apparatus is used as a network scanner configured to read a document and forward corresponding image data to a network, delay memories M, C, K allow RGB image data supplied from the scanner to be delayed by an equal time. A specific document detecting section decides whether or not any document image read by the scanner is a specific document and, if it is a specific document, provides a specific document detection signal SOD to a selector. In response to this signal, the selector selects mask data from a mask data retaining section in place of the RGB image data and outputs the mask data. Thus, it is possible to prevent the specific document image data from being transmitted through the network to an external device.

6 Claims, 3 Drawing Sheets

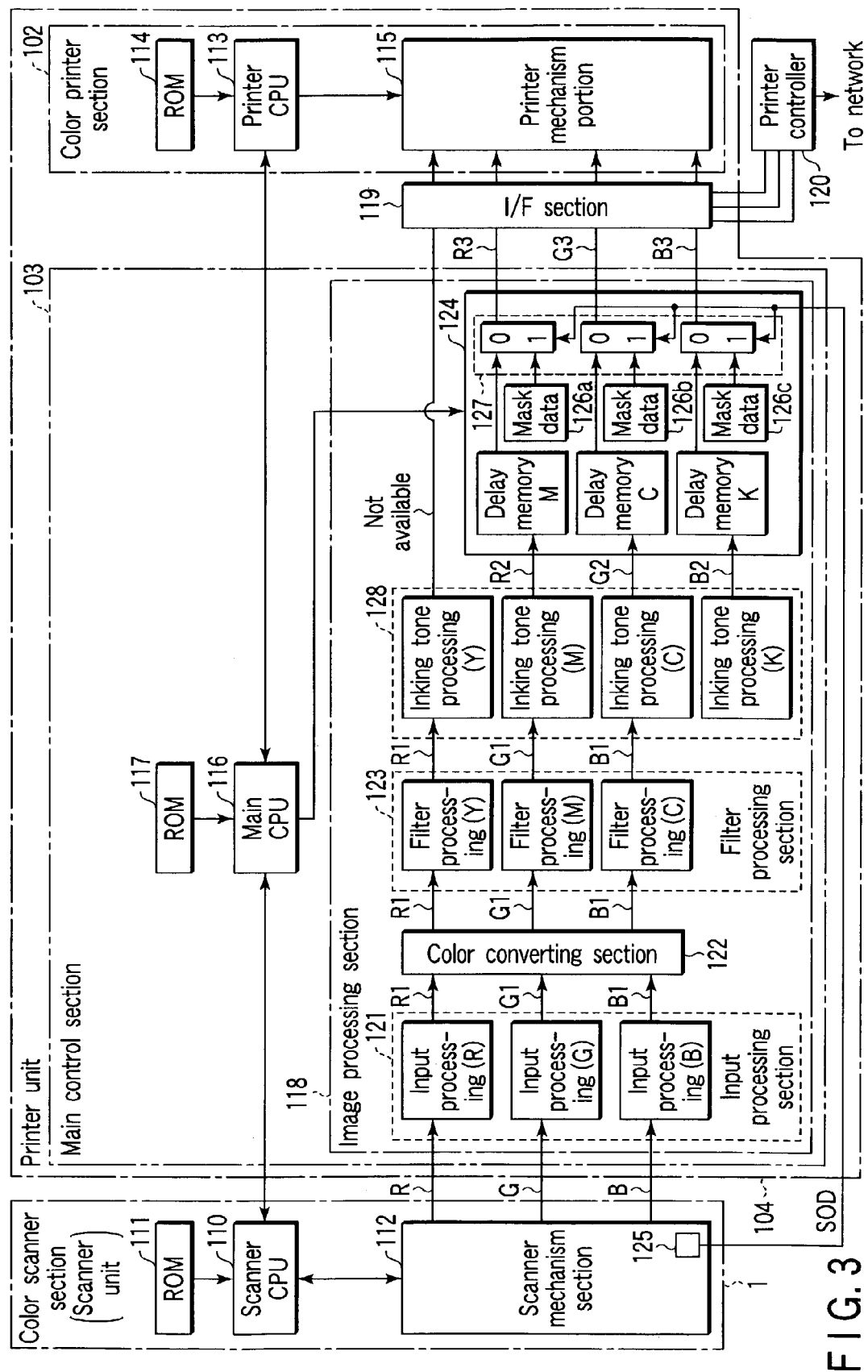
F I G. 3

IMAGE FORMING APPARATUS

CROSS-REFERENCE TO RELATED APPLICATIONS

This application is based upon and claims the benefit of priority from the prior Japanese Patent Application No. 2002-128877, filed Apr. 30, 2002, the entire contents of which are incorporated herein by reference.

BACKGROUND OF THE INVENTION

1. Field of the Invention

The present invention relates to an image forming apparatus, such as a color copier, which can read a color document and transmit corresponding document image data to an external device via a communication network.

2. Description of the Related Art

In the case where copying is performed on a color copier, R (red), G (green) and B (blue) data of a document scanned by a scanner are converted by a color conversion section to Y (yellow), M (magenta), C (cyan) and K (black) data with the use of various kinds of image processing parameters. Color printing is carried out on a printing section having a plurality of process units for forming an image of respective colors with the use of the YMCK data. The respective process units include a photosensitive drum, a light exposure unit, a developing unit, and so on. At the time of printing, in order to prevent an image of respective colors from being displaced on a sheet due to each interval between the process units of respective colors, the image data of respective colors are supplied to the process units while being delayed by a corresponding different time.

The color copier generally has the function of preventing the forgery of bank notes, negotiable securities and so on. In order to detect a given printed matter, such as the bank notes and negotiable securities (hereinafter referred to as a specific document), such a type of color copier has a specific document detecting section. When copying is made on the color copier, the document image data scanned by the scanner is checked by the specific document detecting section. If, therefore, the document image is recognized as being a specific document image, the image data delayed as set out above is converted to different data other than the image data and sent to the printing section. Therefore, it is possible to prevent the specific data from being printed normally.

Recently, a copier has been widely adopted which can be used as a network scanner. In the case where the copier is used as such a network scanner, a document image is scanned by the scanner of the copier and, without being color-converted, the scanned RGB image data is transmitted through a printer controller of the copier to an external unit such as a personal computer, connected via the communication network.

In the case where the copier is used as the network scanner, the image data is transmitted through the printer controller to the external device without being delayed. Even if, therefore, the specific document detecting section recognizes the document which has been scanned by the scanner as being the specific document and the image data which is supplied to the printer controller are changed to other data, the specific document image will be transmitted to some extent to the external device through the printer controller.

In the case where, therefore, the copier is used as the network scanner, checking is made, by prescanning, whether or not the document is the specific document and an image read out by the main scanning is output to the printer controller. Further, the image data scanned at the time of prescanning is not output to the printer controller. If the document image is recognized as being the specific document by the prescanning, the image processing parameters used in the image processing section at the time of main scanning are changed and different data other than the document image are output to the printer controller.

As set out above, in the case where the copier is used as a network scanner, the checking is made by prescanning whether or not the document is a specific document and the change of the image processing parameters is made in a time interval between the checking of the specific document by prescanning and the starting of main scanning.

In the case where, however, a normal document is set on the document glass at the time of prescanning and it is replaced by the specific document at the time of main scanning, there is sometimes a case where part of the specific document is read as a normal image, output to the printer controller and further forwarded to the external device. At this time it may be considered that the specific document is read from various directions and positions and the corresponding imperfect images obtained at this time are synthesized with the use of an image processing technique. Therefore, it is not possible to prevent a forgery sufficiently in a conventional color copier.

BRIEF SUMMARY OF THE INVENTION

It is accordingly the object of the present invention to provide an enhanced forgery preventing function in a copier.

In order to achieve the above object, according to an aspect of the present invention, there is provided an image forming apparatus in which, when RGB image data read by the scanner are transmitted through a printer controller to an external device, such as a personal computer, connected to a network, the RGB image data are delayed by an equal time. The delayed image data are output past an image selecting section to the printer controller.

When the image read by the scanner is decided as being a specific document, an image selection section selects mask data and the delayed image data are converted to mask data. As a result, the image data of the specific document are prevented from being transmitted through the printer controller to an external device.

In the case where the image forming apparatus is of such a type as to adopt a series array of process units, delay memories for delaying MCK image data are provided so as to prevent an image of respective colors from being displaced on a sheet. According to an embodiment of the present invention, these delay memories are used to delay the RGB image data by a predetermined time.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

FIG. 3 is a block diagram for explaining an operation involved when the image forming apparatus of FIG. 1 is used as a network scanner.

DETAILED DESCRIPTION OF THE INVENTION

Figure 1:
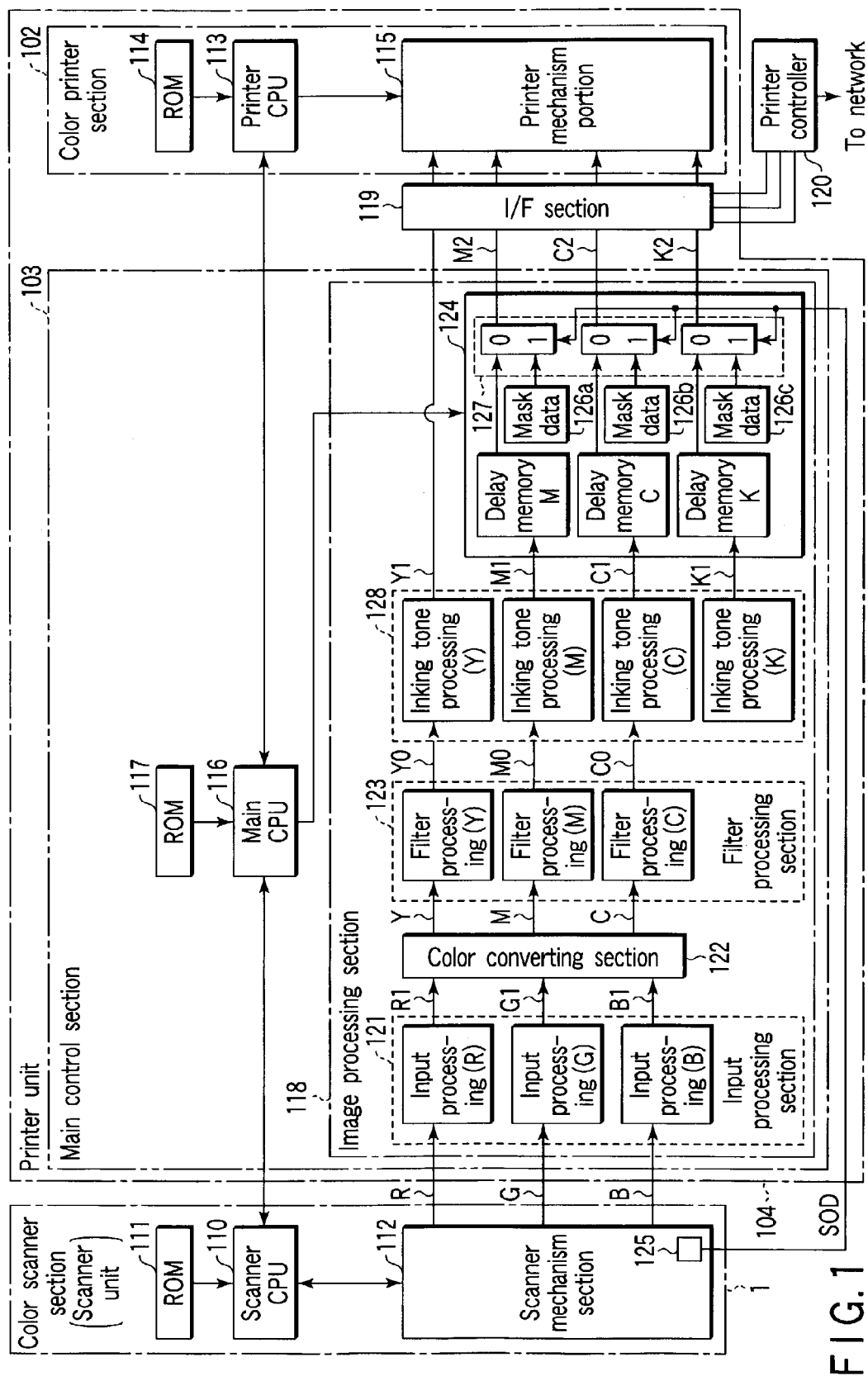
FIG. 1 is a block diagram diagrammatically showing an inner structure of an image forming apparatus according to the present invention which forms a copying image by reading a color image from a document.

With reference to the drawing an explanation will be made in more detail below about an embodiment of the present invention. The following explanation is about the embodiment of the present invention and is not restricted to the apparatus or method of the present invention.

FIG. 1 is a block diagram diagrammatically showing an inner structure of an image forming apparatus, such as a digital color copier, according to the present invention which reads a color image on a document and forms a corresponding reproduced image. The present image forming apparatus generally comprises a color scanner section 101 for reading a color image on a document and a printer unit 104. The printer unit 104 includes a main control section 103 for generally controlling the whole image forming apparatus, a color printer section 102 for allowing a copy image which corresponds to a color image input from the color scanner section 101 under control of the main control section 103 to be formed on a sheet, and an interface section and printer controller 120 configured to allow image data which are provided from the main control section 103 to be transmitted to an external unit (not shown), such as a personal computer, connected to a network.

The color scanner section 101 reads, as a light intensity, an image of an object to be copied (document), not shown, set on a document glass by an automatic document feeding device and generates RGB image signals.

The color scanner section 101 comprises a scanner CPU 110 for controlling a whole section, a ROM 111 for storing a control program, etc., a RAM, not shown, for storing data, and a scanner mechanism section 112.

The scanner mechanism section 112 comprises an optical system for reading a document through a scanner, a moving mechanism for moving the optical system along the document glass, a color image sensor for allowing a corresponding document image to be received through the optical system and converting it to image signal of respective colors, an image correction section for correcting the image signals output from the color image sensor, and so on. During the reading out of the object to be copied, RGB image signals are substantially simultaneously output from the scanner mechanism section 112.

The color printer section 102 comprises a CPU 113 for controlling a whole section, a ROM 114 for storing a control program, etc., a RAM (not shown) for storing data, and a printer mechanism section 115.

The printer mechanism section 115 comprises a printer for performing a print operation based on image data (YMCK) of respective colors into which color separation is done by an image processing section 118 as will be set out below. The printer includes, for respective colors, a photosensitive drum serving as an image carrier, a charging unit for charging the surface of the photosensitive drum, a light exposure unit for forming an electrostatic latent image on a photosensitive drum by a semiconductor laser emitting unit whose light emission is controlled based on the image data (YMCK) of respective colors into which color separation is effected, a developing unit for developing the electrostatic latent image on the drum as a visible image by a toner image, a conveying mechanism for conveying a sheet as an image forming medium, a transfer unit for allowing the toner image on the drum to be transferred to the sheet conveyed by the conveying mechanism, a fixing unit for thermally fixing the toner image transferred onto the sheet by the transfer unit, and so on.

The main control section 103 comprises a main CPU 116 for controlling a whole apparatus, a ROM (read only memory) 117 for storing a control program, etc., and an image processing section 118 for allowing color conversion to be done on image data of respective RGB colors, as color-separated image data, input from the color scanner section 101 and filtering processing to the done on the image data and outputting print data to the color printer section 102.

The main control unit 103 has, though not shown, a RAM for temporarily storing data, an NVRAM (nonvolatile RAM) backed up by a battery unit and serving as a nonvolatile memory, a page memory having an area capable of storing image information corresponding to a plurality of pages and configured to allow compressed data corresponding to image information from the color scanner section 101 to be stored in a page-by-page fashion, and a page memory control section for storing and reading the image information into and out of the page memory.

The image processing section 118 comprises an input processing section 121 for allowing image data whose colors are separated into R, G and B to be received from the color scanner section 101 and allowing them to be amplified and filtered, a color conversion section 122 serving as a color conversion means for converting the RGB image data which are input from the image processing section 121 to YMCK data, a filter processing section 123 for performing enlarging, reducing, background removed, noise elimination, edge-enhancing, etc., processing the YMCK image data output from the color conversion section 122, and a timing adjusting section 124 for outputting image data of M2, C2 and K2 in a timing corresponding to the interval of the respective photosensitive drums relative to the image data of Y1, M1, C1, K1 coming from the filter processing section 123.

Figure 2:
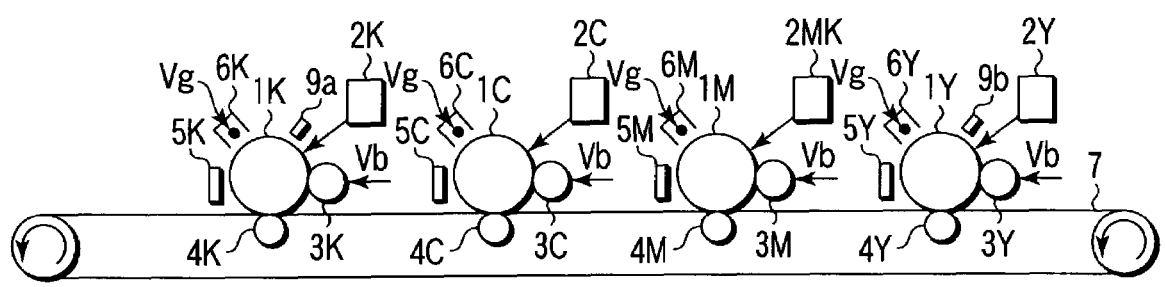
FIG. 2 is a view diagrammatically showing a structure of a printer mechanism section.

FIG. 2 is a view diagrammatically showing a structure of the printer mechanism section 115. The printer mechanism section 115 has a four-series tandem-type electrophotographic processing structure.

This four-series tandem-type processing section comprises a 4-unit array in which four process units corresponding to the four YMCK colors are arranged in a horizontal direction. The respective process unit includes a photosensitive drum (hereinafter referred to as a photosensitive body) 1, a light exposure unit 2, a developing unit 3, a transfer roller 4, a discharger 5, and a charger 6, noting that these elements are shown with added letters of respective colors (YMCK) respectively.

A charging grid bias voltage Vg is applied to the grid of the charger 6 and the surface of the photosensitive body 1 is charged to a corresponding voltage. The light exposure unit 2 emits a laser beam corresponding to the image signal to the photosensitive body 1 to form an electrostatic latent image on the surface of the body 1. A development bias Vb is applied to a magnet roller (not shown) within the developing unit 3 to allow toner to be charged by this bias voltage. The toner is deposited on a lower potential portion of the photosensitive body 1 in a way to correspond to the development bias Vb. A sheet which is fed from a sheet supply section (not shown) is conveyed on a conveying path 7 and the toner is transferred to the sheet while passing through a nip between the transfer roller 4 and the photosensitive body 1. A residual charge on the photosensitive body 1 is removed by the discharger 5.

Now, reference goes back to FIG. 1. When, during the scanning of the document by the scanner section 101, a specific document detecting section 125 detects a currently reading document as being a specific document, a specific document detecting signal SOD is immediately set to "1" (high level). In response to this, a selector 127 selects an input "1" and mask data stored in mask data retaining sections 126a to 126c are output to the printer section 102. In this connection it is to be noted that, as the mask data, use may be made of proper luminance data. As a result, based on the input data, the printer section 102 forms an image on the sheet.

In the delay memories M, C and K, a delay amount (memory capacity) of, for example, the delay memory M corresponds to a time in which a sheet is moved past a distance between the photosensitive bodies 1Y and 1M. Generally, the specific document detecting section 125 can detect a specific document image on any document in a time smaller than that in which the sheet is moved past a distance between these photosensitive bodies. Thus, there is less chance that the specific document image will be printed to even a slight extent as a normal image by the printer section 102.

Although the present image forming apparatus has been explained as being used as a copier, now an explanation will be made below about using it as a network scanner while referring to FIG. 3. In this case, RGB document image data read by the scanner 101 are transmitted through the printer controller 120 to an external device connected to a communication network.

Although, in FIG. 3, R1, G1 and B1 image data read by the scanner section 101 are input to the color conversion section 122, these image data are not color-changed and are output to the route of the MCK image data. Such a setting of the color conversion section 122 is done under control of the main CPU 116.

Further, the image data, after being processed by the filter processing section 123, are fed past an inking tone processing section 128 and delay memories M, C and K to the selector 127. The output of the selector is output through the interface section 119 to the printer controller 120.

It is assumed that, in FIG. 3, the photosensitive drums are arranged in the color order to Y, M, C and K. From the standpoint of compensating the distance between the drums, the relation among the delay memory M, delay memory C and delay memory K is so set as to satisfy the following:

Memory capacity of delay memory C
$\geq 2 \times$ memory capacity of delay memory M
Memory capacity of delay memory K
$\geq 3 \times$ memory capacity of delay memory M In the case where the present image forming apparatus is used not as the copier but as a network scanner for reading a document image, it is not preferable to create a time displacement among the RGB data by delaying the image data by means of the delay memories M, C and K. Therefore, here, the memory capacities used under the delay memories C and K are restricted to that of the delay memory M of the least memory capacity. This control is done by the main CPU 116.

By restricting the memory capacities used by the delay memory C and delay memory K to the same capacity as that of the delay memory M, the RGB image data can be output to the printer controller 120 without involving any time difference among these image data R, G and B.

The specific document detection signal SOD output from the specific document detecting section 125 in the scanner section 101 is sent to the CPU 116 and selector 127 and, normally, this signal is set to a "0" (low level). When the specific document detection signal SOD is in the "0" state, the image data passing through the delay memories are selected by the selector 127 and supplied to the printer controller 120.

In the case where the document read out by the scanner section 101 is detected as being a specific document, the specific document detection signal SOD is immediately set to a "1". In response to this, the selector 127 selects the input "1" and mask data stored in the mask data retaining sections 126a to 126c are output to the printer controller 120.

Even in the case where, as set out above, the present apparatus is used as the network scanner, the read-out image data are delayed by the delay memories. If the read document is a specific document, even when the image data of the read specific document are output from the delay memories M, C and K, these are replaced by the mask data. Thus there is no possibility that the image data of the specific document will be output to the printer controller 120 and forwarded to an external device such as a client PC.

Further, since, without the prescanning, document data is read by one main scanning only, there is no inconvenience that, by replacing a normal document with a specific document in the time interval from the end of prescanning to the start of main scanning, a portion image of the specific document will be output as a normal image to the printer controller and the corresponding image data will be forwarded to a client personal computer as may be done with the conventional apparatus.

According to the present invention, therefore, it is possible to improve the forgery preventing function of the copier.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image forming apparatus comprising:
   a printer section having a plurality of process units arranged in a tandem fashion and configured to form an image of respective colors on a sheet;
   a scanner section configured to read a color document as three RGB color components and provide RGB image signals;
   a delay section configured to store the RGB image signals provided from the scanner section as RGB image data to delay transmission of the RGB image data by a predetermined time;
   a mask data retaining section configured to retain mask data;
   a selecting section configured to allow one of the delayed RGB image data coming from the delay section, on one hand, and mask data coming from the mask data retaining section, on the other, to be selected in accordance with a select signal and to be output;
   a printer controller configured to allow the data which is selected by the selecting section to be transmitted as an output signal to an external device connected to the image forming apparatus via a communication network, the external device being external with respect to the image forming apparatus;

a specific document deciding section configured to decide whether or not the document read by the scanner section is any specific document and, if the document is the specific document, set the select signal to an active level and send the select signal to the selecting section, the selecting section being responsive to an active level of the select signal to select mask data coming from the mask data retaining section;

a color conversion section configured to allow the RGB image signals which are supplied from the scanner section to be converted to image data of colors suitable for the respective process units of the printer section;

a plurality of delay memories configured to, when the image of respective colors is formed on the respective process units on the basis of the color image data converted by the color conversion section, prevent the respective colors of the image from being displaced on the sheet due to a distance between the respective process units, the delay section being comprised of the plurality of the delay memories; and a control section configured to, when the image data is transmitted by the printer controller to the external device through the communication network, control the plurality of delay memories to allow capacities of the memories to be made equal.

2. An image forming apparatus comprising:

a scanner section configured to read a color document as three RGB color components and provide RGB image signals;

a color conversion section configured to allow the RGB image signals which are supplied from the scanner section to YMC image signals;

a printer section having a plurality of process units arranged in a tandem fashion and configured to form an image of respective colors on a sheet on a basis of the YMC image signals;

a mask data retaining section configured to retain mask data;

a first delay memory configured to store a first color image signal provided from the color conversion section to delay transmission of the first color image signal by a predetermined time;

a first selecting section configured to allow one of the delayed first color image signal coming from the first delay memory, on one hand, and mask data coming from the mask data retaining section, on the other, to be selected and to be output;

a second delay memory configured to store a second color image signal provided from the color conversion section to delay transmission of the second color image signal by a predetermined time, a third color image signal being output from the color conversion section directly to the printer section;

a second selecting section configured to allow one of the delayed second color image signal coming from the second delay memory, on one hand, and mask data coming from the mask data retaining section, on the other, to be selected and to be output; and a specific document deciding section configured to decide whether or not the document read by the scanner section is any specific document;

wherein the printer section starts to receive the first to third color image signals in the order of the third color image signal, the first color image signal, and the second color image signal, and each of the receipt start time is shifted by a predetermined time; and the first and second selecting section output mask data retained in the mask data retaining section when the specific document deciding section decides that the document is the specific document.

3. The image forming apparatus according to claim 2, further comprising:

a signal generating circuit configured to generate a forth color image signal on a basis of the first to third color signals;

a third delay memory configured to store the forth color image signal provided from the signal generating circuit to delay transmission of the forth color image signal by a predetermined time; and a third selecting section configured to allow one of the delayed forth color image signal coming from the third delay memory, on one hand, and mask data coming from the mask data retaining section, on the other, to be selected and to be output;

wherein the fourth color image signal is transmitted to the printer section after the transmission of the second color image signal to the printer section has started.

4. The image forming apparatus according to claim 3, wherein the third selecting section output mask data retained in the mask data retaining section when the specific document deciding section decides that the document is the specific document.

5. The image forming apparatus according to claim 4, further comprising:

a printer controller configured to allow the RGB image signals which are provided from the scanner section to be transmitted as output signals to a device connected to the image forming apparatus via a communication network;

wherein when the printer controller outputs the RGB image signals to the device, the color conversion section outputs the input RGB image signals with no conversion.

6. The image forming apparatus according to claim 5, wherein the RGB image signals output from the color conversion section are stored into the first to third delay memory respectively.

* * * * *